Dec. 3, 1968 S. A. VENCEL ET AL 3,414,349
EYE DOMINANCE TESTING MACHINE
Filed Nov. 27, 1964

INVENTORS.
STEVEN A. VENCEL
BY and KENT L. GRAY

Lockwood, Woodard, Smith & Weikart
Attorneys

United States Patent Office 3,414,349
Patented Dec. 3, 1968

3,414,349
EYE DOMINANCE TESTING MACHINE
Steven A. Vencel, Bloomington, Ind., and Kent L. Gray, Mount Pleasant, Mich., assignors to Indiana University Foundation, Bloomington, Ind.
Filed Nov. 27, 1964, Ser. No. 414,274
5 Claims. (Cl. 351—36)

ABSTRACT OF THE DISCLOSURE

An eyepiece for both eyes, and a field board spaced behind it. Blinder plates behind the eyepiece and mounted near it on a rod for adjustment to permit view of the board with both eyes; then only one eye; then only the other eye. An alignment rod between the blinder plates and field board and movable laterally by turning a knob for alignment with a line on the field board as the user sees it.

BACKGROUND OF THE INVENTION

This invention relates generally to eye testing machines, and more particularly to a machine enabling a determination of which of the two eyes of a person is the dominant eye, and to what extent it is dominant.

It is well known that people have one eye which is dominant, and many such persons are aware of this but do not appear to be adversely affected by it. The degree of eye dominance affects an individual's vision; and it has been found that the functioning of a person in certain environments and when employed at certain tasks or at play is affected by eye dominance, and may be so affected as to create a serious handicap.

Eye dominance is significant in the use of tools and gauges in precision work, and in the reading of dials on special instruments used in precision work, and in the use of sighting devices such as the microscope. Other instances can be cited where eye dominance has an affect upon co-ordination in the individual, and these include the synchronizing of aiming and positioning of shoulder fire-arms, batting from the left or right-hand side of the plate in the game of baseball, catching, pitching and control in the game of baseball, co-ordination in the playing of musical instruments, synchronization of eye and hand movements for given skills such as carving, sculpture, tool and die making.

Eye dominance is of considerable importance in the operation of various types of moving machines including cranes, automobiles, boats and airplanes. With regard to automobiles, eye dominance has some bearing on tendencies to drive near the center line divider or close to the berm edge of the driving surface. It contributes to ease or difficulty of parking and has a bearing on the use of the rear view and side mirrors. The effects of glare upon the individual steering the automobile, as well as placement of roadside signs and instruments and controls in the vehicle, are all related to eye dominance.

Because of the importance of the knowledge of eye dominance, and its widespread implications and effects, it is desirable to provide easily taught and used equipment to accurately appraise the condition of eye dominance in individuals, and it is the general object of the present invention to provide an improved machine for testing eye dominance.

A further object is to provide a machine of simple and inexpensive construction which yields direct and accurate results.

A further object is to provide a machine which can easily and rapidly test the eye dominance of any individual, and whose operation and proper use can readily be taught even to untrained persons.

The full nature of the invention will be understood from the accompanying drawings and the following description and claims:

Figure 1:
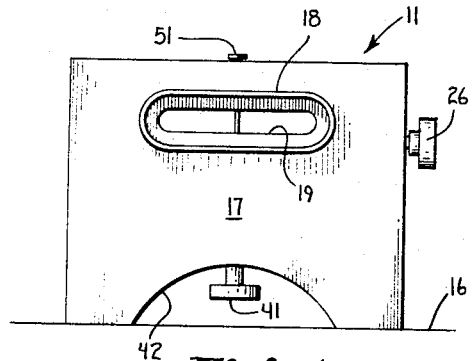
FIG. 1 is a front elevational view of a typical embodiment of the present invention.
Figure 3:
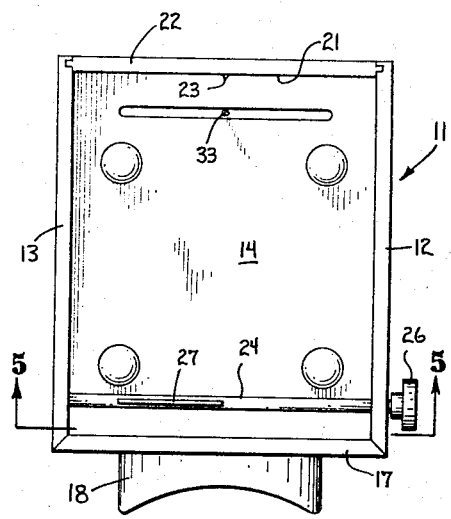
FIG. 3 is a top plan view thereof with the top removed to illustrate certain interior details.
Figure 2:
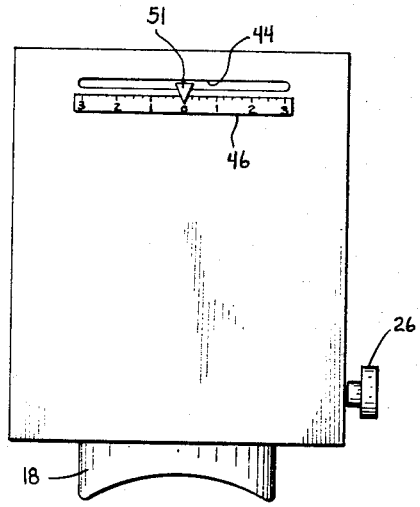
FIG. 2 is a top plan view thereof.
Figure 4:
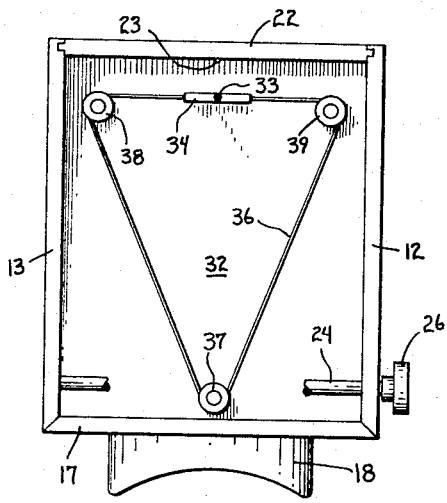
FIG. 4 is a top plan view with the top and floor removed to show means for driving the alignment rod.
Figure 5:
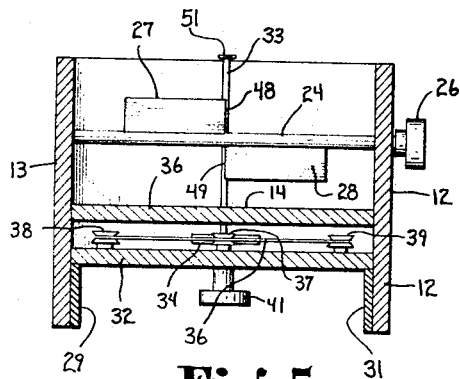
FIG. 5 is a section therethrough taken along the line 5–5 in FIG. 3 and viewed in the direction of the arrows.

Referring now to the drawings in detail, the machine has a main body 11 having a chamber therein with the side walls 12 and 13 and the floor 14, the floor being disposed in vertically spaced parallel relationship to a table top or other supporting surface 16. There is a front cover 17 closing the front of the chamber, this cover having an eyepiece 18 mounted thereon providing an appropriate glare shield for the horizontally extending slot 19 in the front cover. This slot is wide enough so that both eyes of an individual being tested can observe simultaneously the entire front face 21 of the field board 22 disposed at the rear end of the chamber of the unit. This field board has a vertically extending alignment line 23 horizontally centered on the front face thereof. Likewise, the slot 19 in the front cover is horizontally centered.

A horizontal rod 24 is rotatably mounted in the side walls and has a knob 26 mounted thereon projecting outside of one of the side walls. This rod has a pair of blinder plates 27 and 28 mounted thereon on coplanar relationship, the plate 27 being disposed above the rod and plate 28 being disposed below the rod. The plates are of a size and shape and are located such that when plate 27 is disposed as shown, the view of the front face of the field board is obscured or completely blocked for the left eye but the entire field board can be observed by the right eye. When the blinder plates are in this position, the right eye can be tested. By rotating the knob 26 through 180 degrees, the plate 28 is disposed above the rod and plate 27 below. When in this condition, the right eye is unable to observe the field board, whereas the left eye can see the entire field board. The left eye can then be tested.

Rails 29 and 31 are provided on the inside faces of the wall members where they extend below the floor 14 to support the floor above the supporting surface. These rails receive an alignment rod mounting board 32 which may be slid into place on the rails from the back of the body before the field board is installed. This alignment rod mounting board has an upstanding alignment rod 33 mounted to a horizontal bar 34 which is secured to a string 36 which passes around pulleys 37, 38 and 39. Pulley 37 is at the upper end of a shaft connected to a knob 41 which extends below the board 32 and is accessible from the front of the machine through the opening 42.

The alignment rod 33, in addition to projecting upwardly through the floor 14 and through the chamber continues up through a slot 44 in the roof of the chamber, this slot 44 extending parallel to the front face of field board 22 and horizontally centered in the unit. A scale 46 is disposed on top of the roof member and has graduations thereon which may be in any suitable units of length, although one quarter inch graduations have been found to be satisfactory. The zero marking on the scale is equidistant between the side margins of the top of the chamber. So it is seen that the alignment line 23, the vertical center of the slot 19 in the front panel, the margins 48 and 49 of the plates 27 and 28, respectively, all lie in a vertical plane which is disposed equidistant between the side walls 12 and 13 and is perpendicular to the front face 21 of the field board 22.

Illumination in the chamber is provided by means of four lamps disposed on the floor of the chamber and arranged with respect to the alignment rod so that the entire field board is illuminated without shadows and the alignment rod is illuminated without shadows. The blinder plates are provided with a dull and preferably black finish in order to avoid any light reflection therefrom.

In the use of the device of the present invention, the person being tested should first observe the alignment rod and field board with both eyes, this being accomplished by rotating the rod 24 so that the blinder plates are in a horizontal or just slightly inclined plane so as not to obstruct the vision of either eye. Then the alignment rod 33 is positioned various places laterally in the chamber by rotating the knob 41, until the rod appears to be aligned with the alignment line, and a scale reading is made. If the pointer 51 is to the left of zero on the scale, the left eye is the dominant eye.

Then the knob 26 is turned to place one of the blinder plates in position to obstruct the vision of the left eye. Then the person being tested turns the knob 41 to move the rod 33 to a position where it appears to cover or be aligned with the alignment line 23 on the field board. A second scale reading then is made of the position of the alignment rod.

The knob 26 is then rotated 180 degrees to place the other blinder plate in position to block the vision of the right eye. The person being tested then rotates the knob 41 to again position the alignment rod 33 to a place where it appears to cover the alignment line 23. A scale reading is again made. It should be the same as the second reading, to verify that the person is operating the machine properly.

The test can be repeated if desired to establish consistency in results and then the results obtained with the right eye are compared with those of the left eye to determine the eye dominance of the person being tested.

On another person, it might be that his right eye is the dominant eye, in contrast to the first person tested according to the example above. When the second person aligns the rod with both eyes open, the pointer will be to the right of zero, verifying that the right eye is the dominant eye. In that event the blinder plates are turned to obstruct the right eye first, for subsequent rod alignment using the left eye, and a scale reading is then made. Then the recheck is done with the left eye view obstructed by the blinder whereupon the person again aligns the rod. The scale reading thus obtained should correspond to that obtained when both eyes are open.

While the invention has been disclosed and described in some detail in the drawings and foregoing description, they are to be considered to be as illustrative and not restrictive in character, as other modifications may readily suggest themselves to persons skilled in this art and within the broad scope of the invention, reference being had to the appended claims.

The invention claimed is:

1. An eye dominance testing machine comprising:
 a body having parallel horizontally spaced side wall members, a roof member, and a floor member, forming a chamber;
 support means supporting said floor member above a supporting surface and having a pair of horizontally spaced support rails thereon disposed below said floor member
 a field member vertically slidable into position at the rear of said chamber and closing the rear thereof, said field member having a flat front face disposed in a vertical plane, with a vertically extending alignment line horizontally centered on the front face thereof;
 a mounting member horizontally slidable on and supported by said rails;
 a vertically extending alignment rod mounted to said mounting member and projecting up past said floor member through said chamber in front of said field member, and through a first slot in said roof member;
 a front panel covering the front of said chamber and having an opening therein below said mounting member;
 a first knob rotatably mounted to said mounting member and projecting downwardly therefrom between said support means and manually accessible through said front panel opening;
 a plurality of pulleys rotatably mounted to said mounting member, one of said pulleys being directly connected to said first knob;
 a drive string passing around said pulleys and connected to said alignment rod and operable to linearly move said alignment rod horizontally parallel to said field member face when said first knob is rotated;
 a scale horizontally centered on top of said roof member at said first slot and having markings thereon, said alignment rod being registrable with the different markings on said scale as said first knob is rotated, to indicate the position of said rod with respect to said alignment line, the zero marking of said scale being centered with respect to said scale;
 an eyepiece horizontally centered on said front panel and shielding a horizontal slot in said front panel, said horizontal slot being of a width to accommodate observation of said field member simultaneously by both eyes of a person being tested;
 a horizontal rod extending across said chamber in front of said field member and said alignment rod and behind said front panel, said horizontal rod having first and second coplanar blinder plates thereon, said blinder plates having finishes thereon preventing reflection of light, said first plate being above said horizontal rod and said second plate being below said horizontal rod, said first plate being of dimensions blocking the view of said field member by the left eye of said person while accommodating full view of said field member by the right eye of said person.
 said horizontal rod being rotatable on a horizontal axis in said chamber and having a second knob projecting horizontally from one of said wall members outside of said chamber and rotatable by said second knob to place said second plate on top of said horizontal rod and said first plate below said horizontal rod, said second plate being of dimensions to thereupon block the view of said field member by the right eye of said person and accommodate full view of said field member by the left eye of said person;
 and illuminating means in said chamber located with respect to said alignment rod such that said alignment rod is illuminated and said field member is illuminated and shadows on said field member and said alignment rod are avoided.

2. An eye dominance testing machine comprising:
 a body having parallel horizontally spaced side walls, a roof, and a floor, forming a chamber;
 a field board disposed at the rear of said chamber and closing the rear thereof, said field board having a vertically extending alignment line horizontally centered at the front face thereof;
 a vertically extending alignment rod mounted to said body and projecting through said chamber in front of said field board and through a slot in said roof;
 a front panel covering the front of said chamber;
 a first kob rotatably mounted to said body and projecting therefrom and manually operable;
 a drive means connected to said knob and to said alignment rod and operable to linearly move said alignment rod horizontally parallel to said field board when said knob is rotated;

a scale horizontally centered on top of said roof at said slot and having markings thereon, said alignment rod being registrable with the different markings on said scale as said knob is rotated to indicate the position of said rod with respect to said alignment line, the zero marking of said scale being centered with respect to said scale;

an eyepiece horizontally centered on said front panel and shielding a horizontal slot in said front panel, said slot being of a width to accommodate observation of said field board simultaneously by both eyes of a person being tested;

a horizontal rod extending across said chamber in front of said field board and said alignment rod and behind said front panel, said rod having first and second coplanar blinder plates thereon, said first plate being above said horizontal rod and said second plate being below said horizontal rod, said first plate being of dimensions blocking the view of said field board by the left eye of said person while accommodating view of said field board by the right eye of said person, said horizontal rod being rotatable on a horizontal axis in said chamber and having a second knob projecting outside of said chamber and rotatable by said second knob to place said second plate on top of said horizontal rod and said first plate below said horizontal rod, said second plate being of dimensions to thereupon block the view of said field member by the right eye of said person and accommodate view of said field member by the left eye of said person;

and illuminating means in said chamber and so located therein that said field board is illuminated and shadows on said field board are avoided.

3. An eye dominance testing machine comprising:
a body having horizontally spaced side walls, a roof, and a floor, forming a chamber;

a field member at the rear of said chamber and closing the rear thereof, said field member having a vertically extending alignment line horizontally centered at the front face thereof;

a vertically extending alignment rod mounted to said body and projecting through said chamber in front of said field board, and through a slot in said roof;

a front panel covering the front of said chamber;

a first manually operable knob;

drive means connected to said knob and to said alignment rod and operable to linearly move said alignment rod horizontally parallel to said field member when said knob is rotated;

a scale horizontally on top of said roof at said slot and having markings thereon, said alignment rod being registrable with the different markings on said scale as said knob is rotated to indicate the position of said rod with respect to said alignment line, the zero marking of said scale being centered with respect to said scale;

an eyepiece horizontally centered on said front panel and shielding a horizontal slot in said front panel, said slot being of a width to accommodate observation of said field member simultaneously by both eyes of a person being tested;

a second rod extending across said chamber in front of said field member and said alignment rod and behind said front panel, said second rod having first and second blinder plates thereon, said first plate being above said second rod and said second plate being below said second rod, said first plate being of dimensions blocking the view of said field member by the left eye of said person while accommodating view of said field member by the right eye of said person;

said second rod being rotatable by a second knob connected thereto, to place said second plate above said second rod and said first plate below said second rod, said second plate being of dimensions to thereupon block the view of the said field member by the right eye of said person and accommodate view of said field member by the left eye of said person;

and illuminating means in said chamber whereby said alignment rod is illuminated and said field member is illuminated and shadows on said field member are avoided.

4. An eye dominance testing machine comprising:
a body having horizontally spaced side walls, a roof, and a floor, forming a chamber;

a field member at the rear of said chamber and closing the rear thereof, said field member having a vertically extending alignment line at the front face thereof;

a vertically extending alignment rod mounted to said body and projecting through said chamber in front of said field member, and through an opening in said roof;

a front panel covering the front of said chamber;

a first manually operable member;

drive means connected to said first member and to said alignment rod and operable to linearly move said alignment rod horizontally parallel to said field member when said first member is manually operated;

a scale on top of said roof at said opening and having markings thereon, said alignment rod being registrable with the different markings on said scale as said rod is moved with respect to said alignment line;

an opening in said front panel of a width to accommodate observation of said field member simultaneously by both eyes of a person being tested;

means mounting first and second blinder plates in said chamber, said first plate being disposed behind a portion of said front panel opening and blocking the view of said field member by the left eye of said person while accommodating view of said field member by the right eye of said person;

and said mounting means being operable to move said first plate away from behind said front panel opening and move said second plate behind said front panel opening to thereupon block the view of said field member by the right eye of said person and accommodate view of said field member by the left eye of said person;

and illuminating means in said chamber whereby said alignment rod is illuminated and said field member is illuminated and shadows on said field member are avoided.

5. In an eye dominance testing machine, the combination comprising:
a body having horizontally spaced side walls, a roof, and a floor, forming a chamber;

a field member, said field member having a vertically extending alignment line at the front face thereof;

a vertically extending alignment member mounted to said body in front of said field member;

a front panel covering the front of said chamber;

a first manually operable member;

drive means connected to said first member and to said alignment member and operable to move said alignment member horizontally parallel to said field member when said first member is manually operated;

and a scale on said body and having markings thereon, said alignment member having a portion registrable with the different markings on said scale as said first member is operated to indicate the position of said alignment member with respect to said alignment line.

References Cited

UNITED STATES PATENTS 2,440,957   5/1948   Kennedy _____ 351—5

DAVID SCHONBERG, *Primary Examiner.*

M. J. TOKAR, *Assistant Examiner.*